(12) United States Patent
Dunesme et al.

(10) Patent No.: US 9,016,610 B2
(45) Date of Patent: Apr. 28, 2015

(54) WINDING FOR A ROTARY ELECTRICAL MACHINE

(75) Inventors: Xavier Dunesme, Yerres (FR); Jérôme Fournier, Boulogne sur Mer (FR); Jean-Pierre Chochoy, Cremarest (FR); Ludovic Darras, Montreuil sur Mer (FR); Alain Defebvin, Cormont (FR); Stéphane DeClercq, Rang du Fliers (FR); Olivier Luittre, Beaumerie Saint Martin (FR); David Desmet, Saint Martin (FR); Nicolas Langlard, Loos (FR)

(73) Assignee: Valeo Equipements Electriques Moteur, Créteil Cedex (FR)

( * ) Notice: Subject to any disclaimer, the term of this patent is extended or adjusted under 35 U.S.C. 154(b) by 671 days.

(21) Appl. No.: 13/381,810

(22) PCT Filed: Jun. 28, 2010

(86) PCT No.: PCT/FR2010/051327
§ 371 (c)(1), (2), (4) Date: Aug. 2, 2012

(87) PCT Pub. No.: WO2011/004100
PCT Pub. Date: Jan. 13, 2011

(65) Prior Publication Data
US 2012/0292423 A1    Nov. 22, 2012

(30) Foreign Application Priority Data

Jul. 9, 2009   (FR) ...................................... 09 54759

(51) Int. Cl.
*H02K 15/085* (2006.01)
(52) U.S. Cl.
CPC ................................... *H02K 15/085* (2013.01)

(58) Field of Classification Search
USPC ............. 242/432.2, 432.4, 432.5, 434, 434.7, 242/434.8
See application file for complete search history.

(56) References Cited

U.S. PATENT DOCUMENTS 3,995,785 A * 12/1976 Arick et al. ................ 242/432.4
5,860,615 A *  1/1999 Burch ........................ 242/432.5
(Continued)

FOREIGN PATENT DOCUMENTS

DE         198 17 304 B4    6/1999
DE      10 2007 036313 A1   2/2009
EP           1 720 233 A2   11/2006
(Continued)

*Primary Examiner* — Emmanuel M Marcelo
(74) *Attorney, Agent, or Firm* — Berenato & White, LLC (57) ABSTRACT

A method and device for winding a rotor or a stator (2), of a rotary electrical machine, having a series of teeth (21) which are delimited by notches (22). In each notch there are inserted M continuous electric wires (3) constituting a turn; M being equal to 1 or more, characterised in that n×M wires (3) are wound simultaneously in a number n of notches (22), n corresponding to the number of phases and being ≥2. The assembly of the M wires (3) constituting a phase, being inserted in a single notch (22). The device for winding has at least two carriages (4, 5), with a series of teeth, delimited by n notches (40, 50). And, likewise corresponding to the winding, each set of M continuous electric wires (3) constituting a turn, is characterised in that M×n wires (3) are inserted simultaneously in the extension of the n notches (22) of the rotary electrical machine in the n notches (40, 50) in the respective carriages (4, 5). All of the M×n wires (3) are bent together at least twice by bending the carriages (4, 5) relative to one another, and all of the M×n wires (3) thus bent are folded back in the following successive $n_1$ notches (22) of the rotary electrical machine.

15 Claims, 10 Drawing Sheets

(56) References Cited

U.S. PATENT DOCUMENTS

| | | |
|---|---|---|
| 6,254,027 B1 * | 7/2001 | Kunou ................. 242/432.4 |
| 6,616,082 B2 * | 9/2003 | Burch ................. 242/432.4 |
| 6,626,392 B2 * | 9/2003 | Kajita ................. 242/432.6 |
| 2002/0047486 A1 | 4/2002 | Asao et al. |
| 2006/0032040 A1 | 2/2006 | Neet |
| 2009/0026895 A1 | 1/2009 | Chakrabarti et al. |

FOREIGN PATENT DOCUMENTS

| | | |
|---|---|---|
| FR | 2 918 815 | 1/2009 |
| JP | 2009524389 | 6/2009 |
| JP | 2009524392 | 6/2009 |

* cited by examiner

WINDING FOR A ROTARY ELECTRICAL MACHINE

CROSS-REFERENCE TO RELATED APPLICATIONS AND CLAIM TO PRIORITY

This application relates to International Application No. PCT/FR2010/051327 filed Jun. 28, 2010 and French Patent Application No. 09/54759 filed Jun. 9, 2009, of which the disclosures are incorporated herein by reference and to which priority is claimed.

FIELD OF THE INVENTION

The present invention relates to a method for winding by means of continuous wires of the rotor or stator of a rotary electrical machine, such as, for example, an alternator, an alternator-starter, or a starter of a motor vehicle. The rotor rotates in the interior of the stator according to a main axis A. The winding is carried out on the rotor or the stator in the interior of a plurality of notches which are provided for this purpose in the said rotor or stator.

BACKGROUND OF THE INVENTION

The winding of the rotor or stator by means of a continuous wire is habitually carried out phase by phase. For example, for a three-phase machine, the three phases will be wound one after the other, each phase being offset by one or more notches relative to the preceding one. For a double three-phase, the six phases are wound in the same manner one after the other. The wires which constitute each of the phases form axial undulations on each side of the rotor or stator, all of these axial undulations constituting a chignon.

The disadvantage of this type of winding is that the axial undulations of the first phase impede the insertion in the base of the notch of the following phase, and so on, the last phase being hindered by the axial undulations of all the preceding phases. The consequence is that the notches are not filled in an optimum manner, which detracts from the coefficient of filling of the said notches, and therefore the performance of the machine.

The other disadvantage of this type of winding is that the winding time depends on the number of phases to be wound: the larger the number of phases, the longer the winding time, and a double three-phase or six-phase will require twice as to produce as a simple three-phase.

For a stator the winding can be carried out flat or on a closed stator.

It is also possible to wind a plurality of turns of the stator, i.e. a revolution of the stator or rotor, onto a support or core comprising notches which are open to the exterior, then to insert the turns thus wound on the stator by thrusting by expansion the turns of the notches in the support towards the notches in the stator. The disadvantage of this method is that the size of the notches in the support in which the initial winding is carried out has a limited depth and width, since the support must have an outer diameter which is smaller than the inner diameter of the stator, in order to be able to be placed in the interior of the stator, and the number of notches in the rotor and the support must be identical. In addition, the smaller the stator, the larger the number of turns, and thus the more difficult it is for the core to contain them. The winding is thus carried out in several stages, the turns then being connected to one another in order to form a phase.

SUMMARY OF THE INVENTION

The objective of the present invention is to propose a winding method which is at the same time rapid, and permits better filling of the notches, in which the extent of the winding is reduced, thus reducing the quantity of copper used, the insertion of the wires in the notches is entirely radial, the insertion force is lower, and the chignon has improved imbrication of the wires. The method according to the invention also permits winding on a closed stator.

According to the invention, the method for winding the rotor or the stator of a rotary electrical machine comprises a series of teeth which are delimited by notches, in each of which there are inserted M continuous electric wires constituting a turn, M being equal to 1 or more, and the said method is characterised in that n×M wires are wound simultaneously in a number n of notches, n corresponding to the number of phases and being ≥2, the assembly of the M wires constituting a phase and being inserted in a single notch. The n phases are thus all wound at the same time in n successive notches, which makes it possible to save time, but also, since all the n notches are filled at the same time the M wires are all inserted in the base of the notch in an identical manner. In addition, the notches are all filled identically, and there is therefore no difference according to the phase.

According to a particular characteristic, each phase is produced with a continuous wire, i.e. the winding is carried out continuously without interruption of the wire of all the phases throughout the operation of winding in distributed undulation.

According to another particular characteristic, the M wires are put into parallel in the notches and superimposed in a loop which connects two successive notches. During the winding the M wires remain parallel in each of the notches, but also outside the notches, i.e. the wire which is disposed on one of the sides of the first notch will be disposed on the opposite side in the nth following notch. This has several advantages: the wires all have an identical length, since the wire which is on top of the chignon on one side will be below on the other side; the width of the chignon is equal to the depth of the notch, and therefore does not project either on the rotor side or on the head side which can be small within the limit of the magnetic saturation and the surface area necessary to support the bearing.

According to a particular characteristic, the n×M wires are wound by forming a first coil with a loop which is situated at the front of the stator, and by inserting the n×M wires in the $n_1$ following notches, then a second coil with a loop which is situated at the rear of the stator, and by inserting the n×M wires in the $n_2$ following notches. The axial undulations of the n phases are produced in parallel at each coil, and the axial undulations of one phase no longer hinder the insertion of the following phase.

According to another characteristic, the n×M wires are wound by inverting the direction of the winding when all the notches in the stator comprise at least one wire of the n phases. This therefore provides so-called distributed undulating winding.

According to a first variant, M is greater than 1, and the M wires are aligned in the base of the notch. The alignment of the M wires adjacent to one another makes it possible to wind the M wires in parallel along the entire winding, and thus to make the chignon more tidy.

According to a second variant, the notch does not have a tooth root, or the tooth root is asymmetrical, M is greater than 1, and the M wires are aligned adjacent to one another in the width of the notch. The alignment adjacent to one another of the M wires is possible when the notch is not closed (or when there is no tooth root), or when the notch is closed by asymmetrical tooth roots.

According to a particular arrangement, the wires are round. The wires could be rectangular or have a flattened part, or they may not be round, but the corkscrewing of wires of this type is more difficult than for round or oval wires.

According to another arrangement, the loop which is situated at the front or the rear of the stator has a substantially triangular form. This form improves the cooling of the chignon.

According to a particular characteristic, the loop forms an isosceles triangle.

According to another characteristic, the loop forms an isosceles triangle with an angle of 90°.

According to a particular arrangement, the M wires which constitute the loop form an angle β greater than α with the front or rear of the stator, and tan α is equal to f/d, f being the diameter of the wire and d the width of the tooth. Thus, the wires of one phase do not touch the wires of the following phase in the chignon along the entire rising and descending part of the axial undulation of the wires.

According to another arrangement, the M wires which constitute the loop form an angle β with the front or rear of the stator, and tan β is equal to f+2 mm/d, f being the diameter of the wire in mm and d the width of the tooth in mm. The optimum situation is to provide a space of approximately 2 mm between the wires of two successive phases.

The stator is obtained by means of the method according to one of the following claims.

The device for winding of a rotor or stator of a rotary electrical machine, according to the invention, comprises at least two carriages with a series of teeth delimited by n notches, in each of which there are inserted M continuous electric wires constituting a turn, with n corresponding to the number of phases of the rotary electrical machine, and being >2, and M being equal to 1 or more. It is characterised in that M×n wires are inserted simultaneously in the extension of the n notches of the rotary electrical machine in the n notches in the carriages, in that all of the M×n wires are bent at least twice by bending the carriages relative to one another, and in that all of the M×n wires thus bent are folded back into the following $n_1$ notches of the rotary electrical machine. Once the M×n wires have been inserted in the n notches in the stator or rotor of the rotary electrical machine, the operation is recommenced in the following $n_2$ notches, and so on in order to make the complete revolution.

According to an additional characteristic, the direction of winding is inverted by inverting the direction of folding back of the wires into the notches, and a guide bush which aligns the M wires disposed at the rear of the carriages carries out rotation of 180°, and a comb thrusts the turned back M wires to the end of the first carriage. In order to provide distributed undulation, it is necessary to invert the direction of rotation of the winding, and this inversion requires inversion of the alignment of the M winding wires in order for the M wires to be ordered in the same direction in the notches, i.e. the bottom wire remains at the bottom of the notch in both directions of winding.

DETAILED DESCRIPTION

The invention will be better understood by reading the following description, which is provided purely by way of example with a stator of an alternator, and with reference to the attached drawings, in which.

Figure 1:
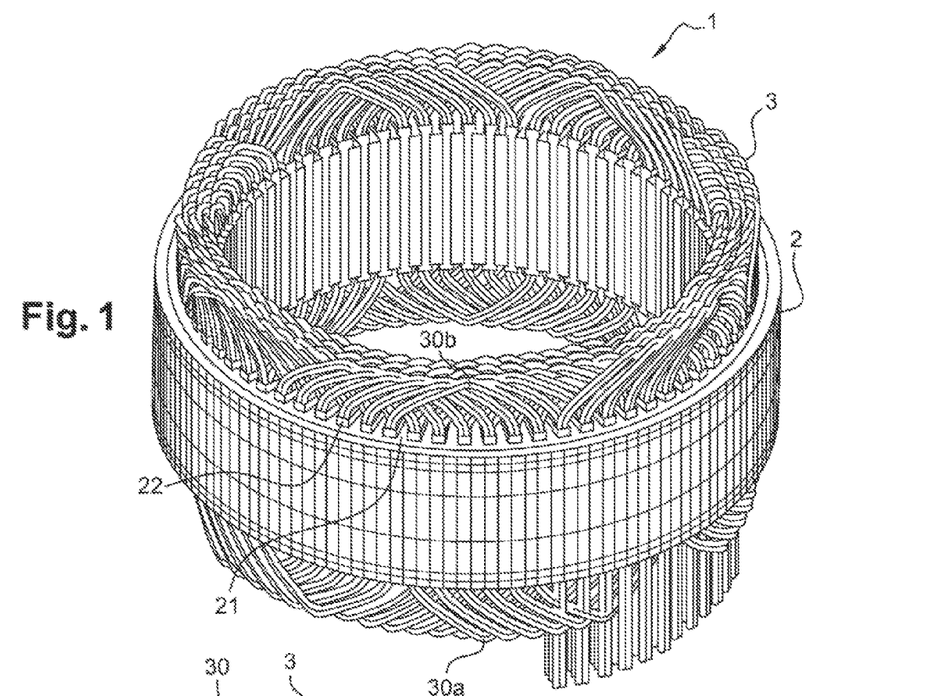
FIG. 1 is a perspective view of a stator of a rotary electrical machine according to the invention.

The stator 1 in FIG. 1 comprises a set of plates 2 with teeth 21 and notches 22. Insulators 23 are disposed in the notches 22. Wires 3 are inserted in the notches 22, each notch 22 receiving the wires of a single phase, such that when there are n phases the wires of a single phase are inserted in all the n notches. There can be from 3 to 7 phases for example. A phase is constituted by one or a plurality of wires 3 wound in the notches 22 in the stator 1, which are bent in the form of a coil and wound in the interior of the stator 1 in the notches 22 in order to form a turn, with the winding of a plurality of turns forming the winding of the complete phase. The winding is so-called distributed undulating when the wire 3 is wound in a circular manner, firstly in a first direction, then, when the first revolution has been completed, it is wound in the inverse direction. The wire 3 has a loop at each undulation, and this loop is situated on the exterior of the stator, alternately on one side or the other of the said stator. During the winding in the inverse direction, this loop is placed in the free space between two loops of the winding in the first direction, and the winding will thus be symmetrical.

Figures 2, 2A:
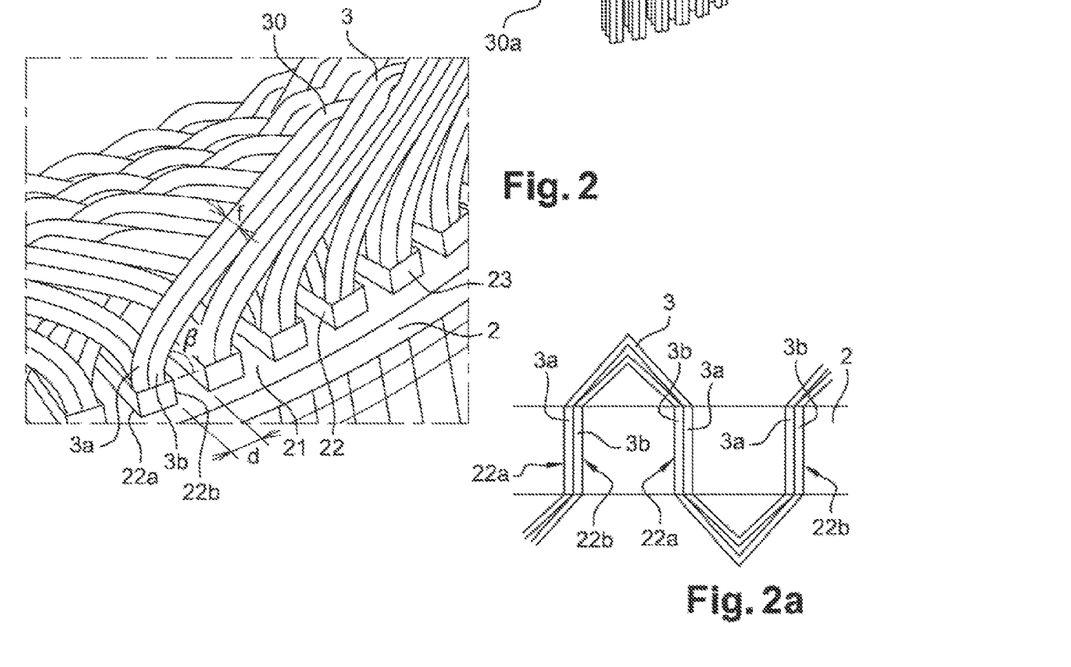
FIG. 2 is a detail view of the chignon in FIG. 1.
FIG. 2a is a partial view of a turn.

The winding of a phase which constitutes a bundle 30 comprises M wires 3, with M being greater than 1. Each of front loop 30a or rear loop 30b of the bundle 30 which projects from each side of the stator 1 is in this case produced in a substantially triangular form, and all of these front or rear loops 30a or 30b form a chignon. The detail in FIG. 2 shows that each of the wires 3 has a diameter f, the width of the tooth 21 is d, and β is the angle of the wires 3 relative to the front or rear of the stator 1. In order to prevent the wires 3 from touching one another, as in FIG. 2b, the angle β must be greater than an angle α corresponding to the angle where the wires would touch one another, i.e. tgα=f/d.

Each loop 30a or 30b of a turn is constituted by M wires 3, and FIG. 2a shows two wires 3a and 3b: these two wires are disposed in a notch 22, the wire 3a is placed on the side 22a of the notch 22, and the wire 3b is placed on the side 22b of the first notch represented in FIG. 2a. In the second notch, where the wires 3a and 3b are then disposed and situated n notches after the first, the wire 3a is on the side 22b of the notch, and the wire 3b is on the side 22a. The loop 30a which is situated at the top of the stator 2 is constituted by the two wires 3a and 3b, where 3a is situated above 3b. On the other hand, the loop 30b which is situated below the stator 2 is constituted by the two wires 3a and 3b, where 3a is situated below 3b. It can thus be seen that each of the wires 3*a* and 3*b* will have the same length once the winding has been completed. The chignon will thus be ordered like the notches, it will have a width equal to the depth of the said notch 22, and thus the wires 3 of the chignon will not project either on the rotor side or on the head side. This makes it possible to have a smaller head, within the limits of its magnetic saturation; the more phases there are, the less saturation there is, and therefore the narrower the head can be (as little as 3.5 mm), and within the limits of a size which is sufficient for the support surface of the bearing (approximately 4 mm).

Figures 2B, 3:
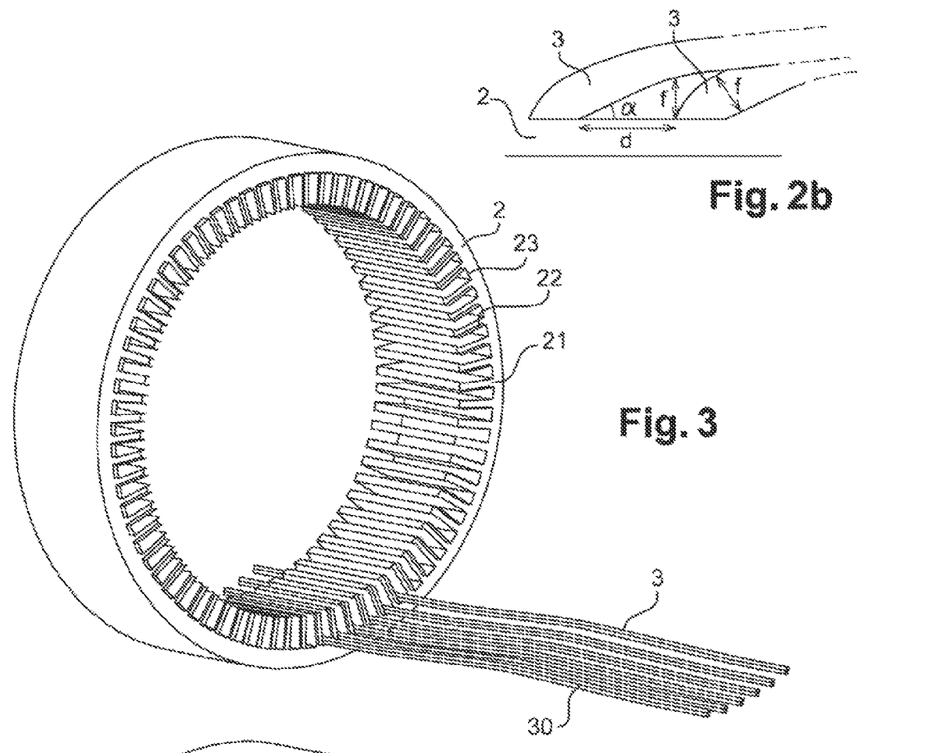
FIG. 2b is a detail view of two winding wires.
FIG. 3 is a perspective view of the stator with wires placed in the notches.
Figure 4:
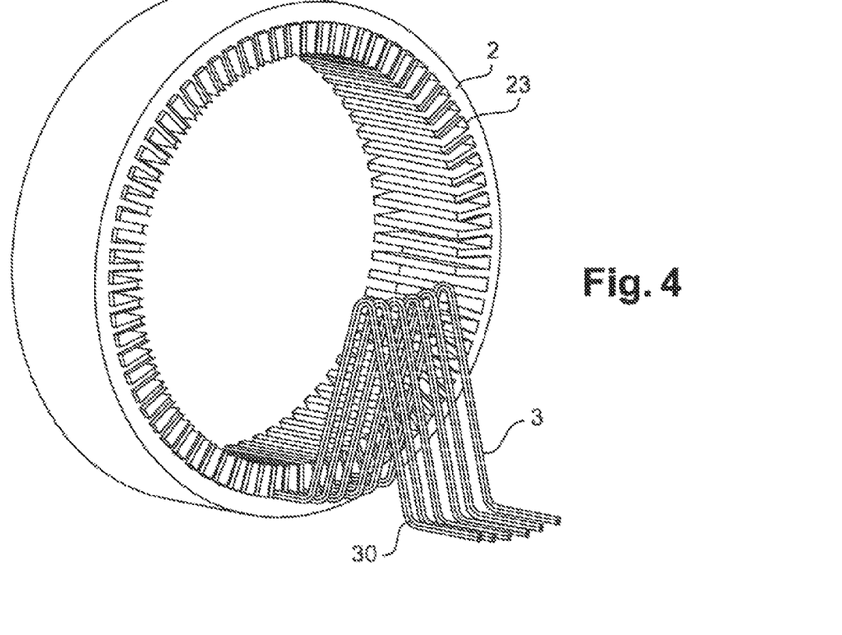
FIG. 4 is a perspective view of the stator with the wires in a first bending position.
Figure 5:
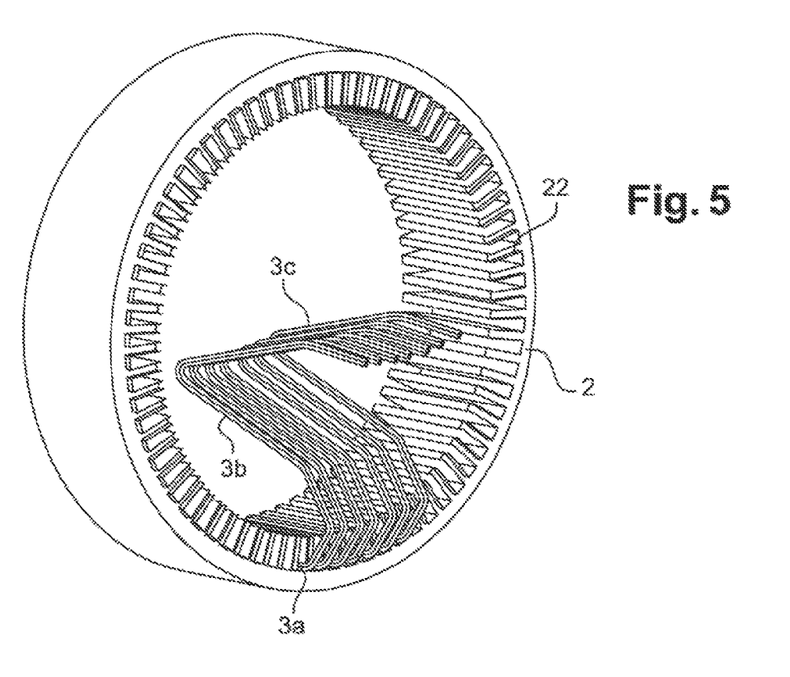
FIG. 5 is a perspective view of the stator with the wires in the second bending position.
Figure 6:
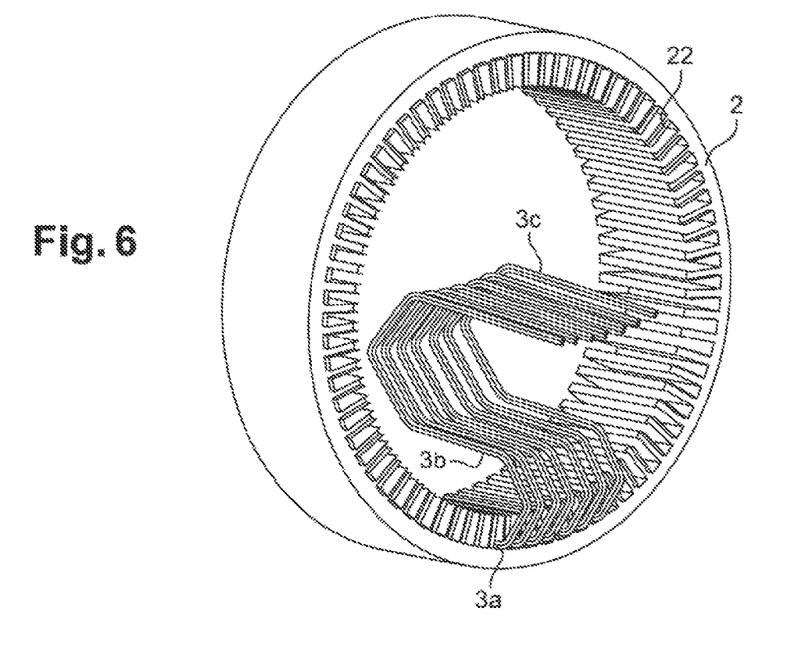
FIG. 6 is a perspective view of the stator with the wires in a third bending position.

As can be seen in FIG. 3, the winding consists of n×M wires 3, with n corresponding to the number of phases. Each of the bundles 30 of M wires 3 is inserted in the n notches 22, and the part of the wires which is inserted in the n notches 22 bears the reference 3*a*. The wires 3 are then bent in the form of an accordion as in FIG. 4, by forming a first bend at more than 90°, a second bend at less than 45°, and a third at more than 90°. The winding assembly is then folded back into the interior of the stator 1, from the edge of the notches 22, by an angle of more than 90°, as represented in FIG. 5, and the same operation is then carried out symmetrically on the other side of the stator 1 (cf FIG. 6).

Figure 7:
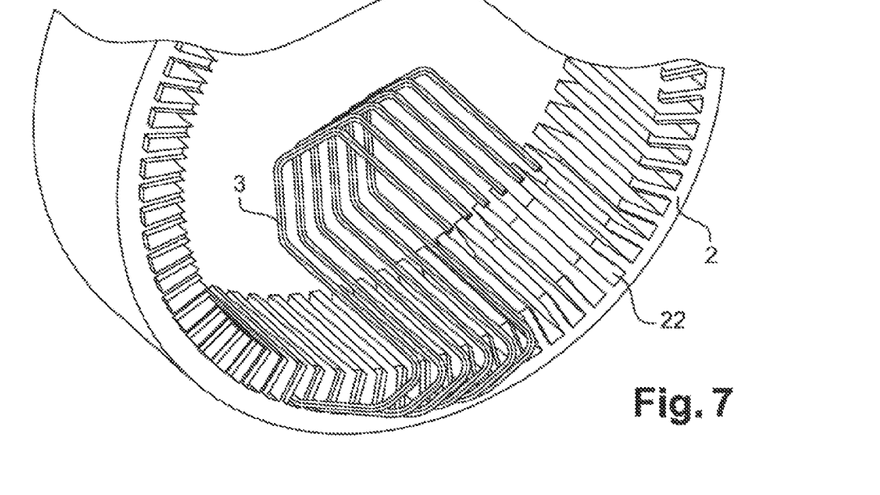
FIG. 7 is a perspective view of the stator in FIG. 6 with the n×M wires folded back.
Figure 8:
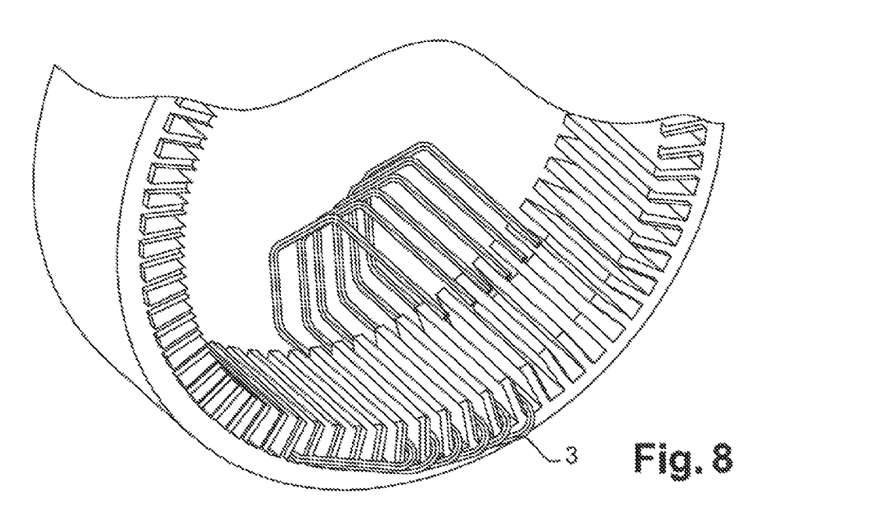
FIG. 8 is a perspective view of the stator FIG. 6 with the n first loops of the coils placed in the n following notches.

Once the first bending operations have been carried out, it is possible to pivot all the n×M wires 3 of the straight part 3*b* into the n following notches, and all of these operations are repeated over and over again until the revolution of the stator 2 has been completed.

Once the revolution has been completed, the direction and orientation of the winding are inverted, i.e. the wires 3 are wound by pivoting them in the direction which is the inverse of the preceding direction.

This winding is carried out by means of a device which can be seen in FIGS. 9 to 21, comprising at least two carriages 4 and 5, a counter-form 6, a bush 7, and a comb 8.

Figure 14:
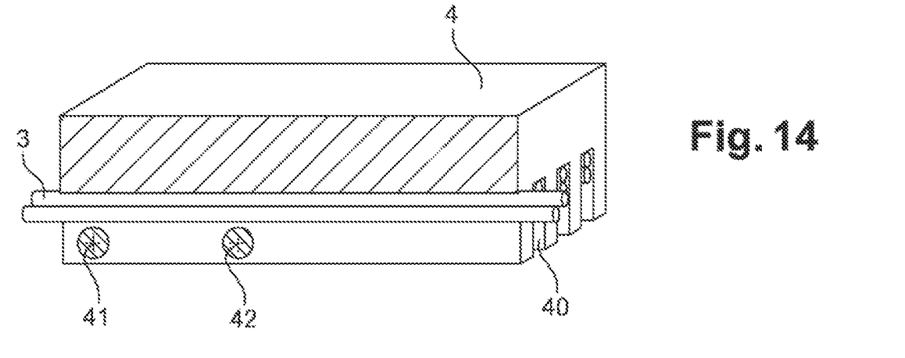
FIG. 14 is a perspective view of the first carriage.

The first carriage 4 in FIG. 14 comprises n notches 40 in which the M wires 3 of a turn are placed, and two winding shafts 41 and 42 disposed perpendicularly to the wires 3.

Figure 15:
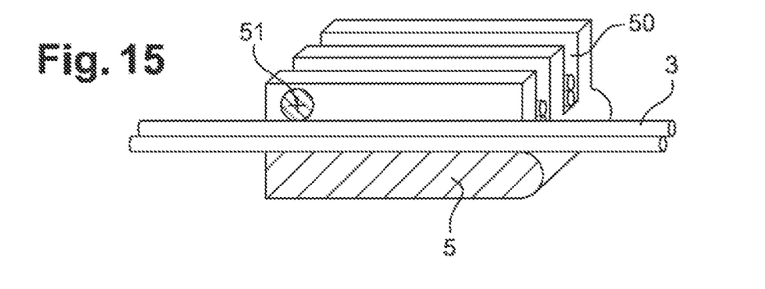
FIG. 15 is a perspective view of the second carriage.

The second carriage 5 in FIG. 15 comprises n notches 50, in which there are placed the M wires 3 of a turn, and a winding shaft 51 disposed perpendicularly to the wires 3 and parallel to the shafts 41 and 42.

Figure 16:
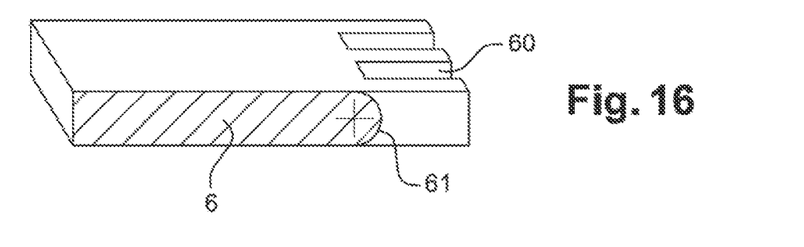
FIG. 16 is a perspective view of the counter-form.

The counter-form 6 in FIG. 16 comprises n notches 60 and a rounded part 61.

Figure 9:
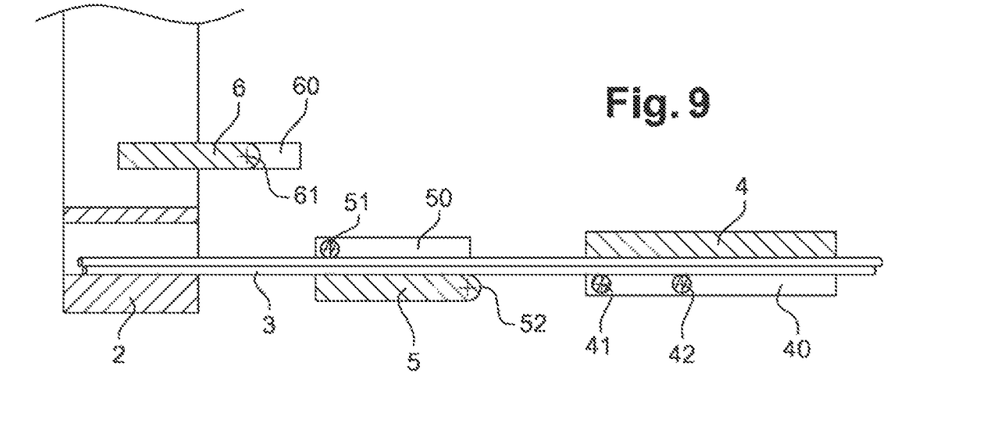
FIG. 9 is a side view of the winding device according to the invention in the starting position.

Two carriages 4 and 5 in FIG. 9 area placed on a matrix (not represented) which permits the movement of the two carriages.

The first carriage 4, illustrated in FIG. 14, comprises n notches 40 in which the M wires 3 are inserted, thus forming the bundle 30. A shaft 41 is disposed at one of the ends of the carriage 4, and a second shaft 42 is placed withdrawn from the first shaft 41, at a distance which corresponds substantially to the triangle side of the loop 30*a* or 30*b* of a bundle 30 which constitutes the chignon. The shaft 41 is detachable.

The second carriage 5, illustrated in FIG. 15, comprises n notches 50 in which the M wires 3 are inserted. A shaft 51 is disposed at one of the ends of the carriage 5.

The counter-form 6, illustrated in FIG. 16, comprises n notches in which the n bundles 30 can be inserted.

A description will firstly be given of the movement of the winding device in order to produce the first part of the winding, then the movement necessary in order to carry out the inversion of the winding will be described, wherein the winding after the inversion is similar to the first winding.

FIG. 9 is the starting position: the M×n wires 3 are aligned in the n notches 40 in the first carriage 4, the n notches 50 in the second carriage 5, and the n notches 22 in the stator 1.

Figure 10:
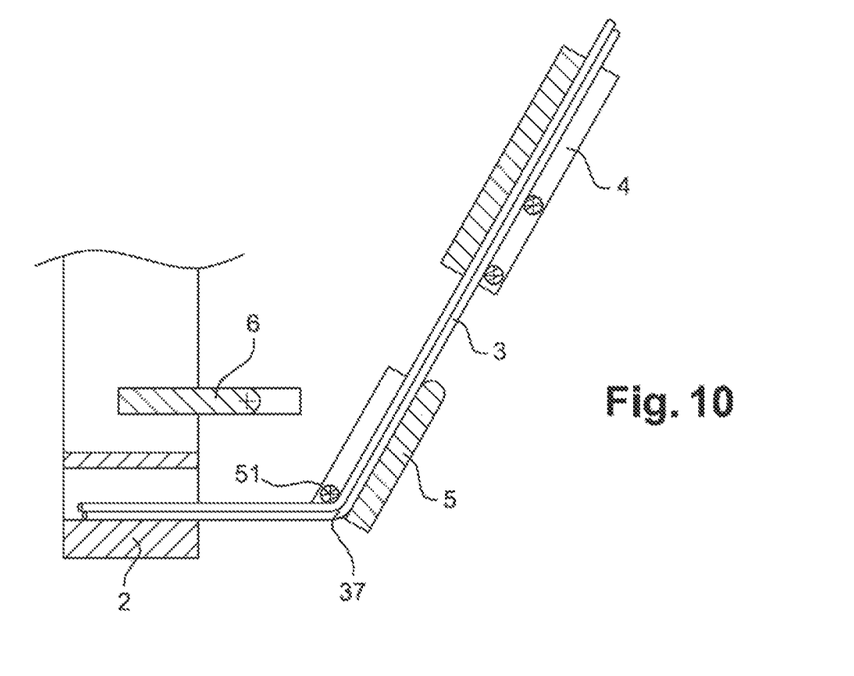
FIGS. 10, 11, 12 and 13 are side views of the device in four successive positions.
Figure 11:
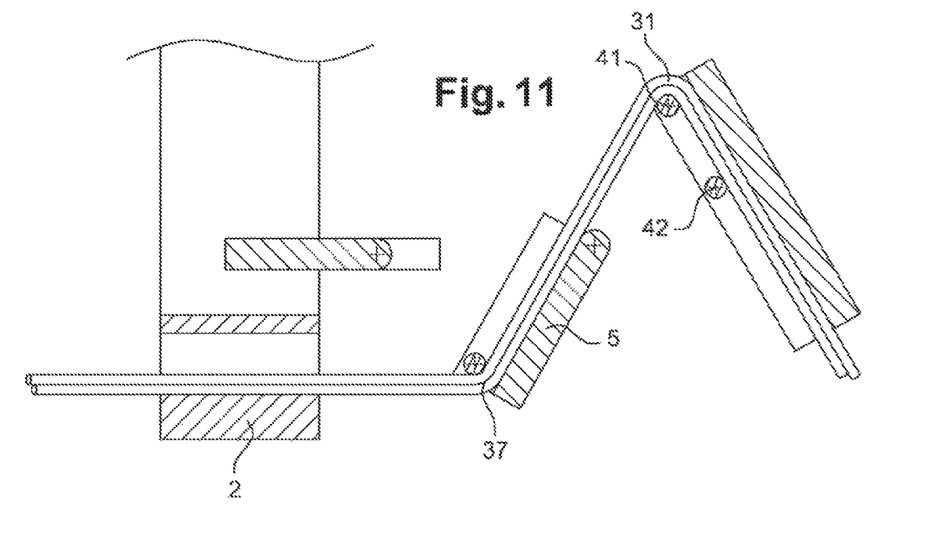

As shown in FIG. 10, the assembly of the two carriages 4 and 5 is pivoted together upwards, which forms the first bend at 37 of the M×n wires 3 around the shaft 51.

Then, the two carriages 4 and 5 arc dissociated in order to form the second bend of the n×M wires 3 (cf FIG. 11) around the shaft 41.

Figure 12:
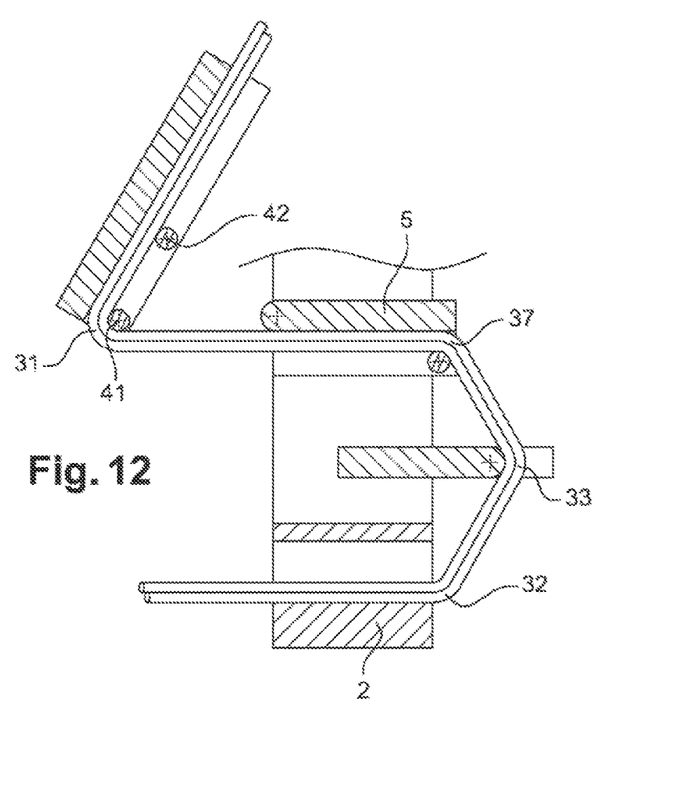

The assembly of two carriages 4 and 5 is then rendered integral once more in the position obtained, then pivoted together with the wires 3 into the interior of the stator 1, as can be seen in FIG. 12, in order to form a new bend of the wires 3 around the end 61 of the counter-form 6, and the wires 3 are disposed in the n notches 60.

Figure 13:
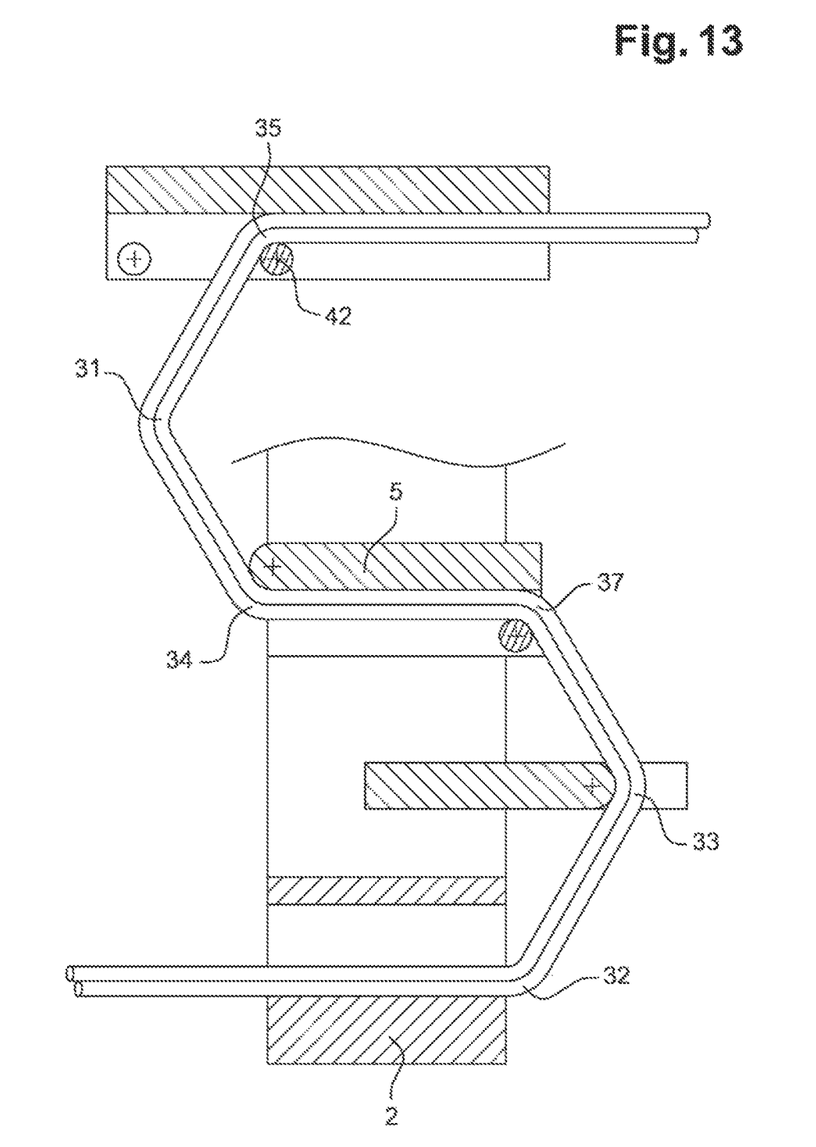

Then, the shaft 41 is withdrawn from the carriage 4, and the said carriage 4 is placed in a position parallel to the carriage 5 and to the counter-form 6, as represented in FIG. 13. This has the effect of bending the wires 3 on the end 51 of the carriage 5 and on the shaft 42 of the carriage 4. Once the bending of the wires 3 has been carried out, all the wires 3 are pivoted onto the 2*n* first notches 22 in the stator 2. The operation is repeated until a complete revolution of the stator 1 has been wound.

In order to carry out distributed undulation, it is necessary to invert the direction of winding, i.e. it is necessary to wind the wires 3 by returning to the starting position of the winding, The fact that the direction of the winding is inverted makes it necessary to invert the order of the wires 3 in the n notches in the carriages 4 and 5, so that the wires 3 are in the same order in the notches 22 in the stator 1.

The inversion of the direction of winding is illustrated in FIGS. 18 to 21.

Figure 17:
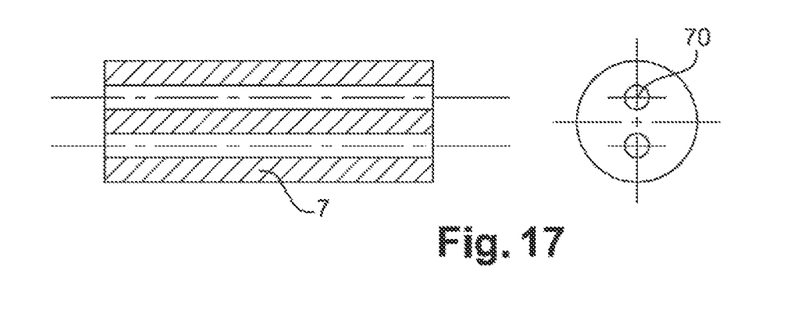
FIG. 17 is a front view of the guide bush.

The bush 7, illustrated in FIG. 17, comprises M holes 70 (in this case two) which are aligned vertically.

Figure 18:
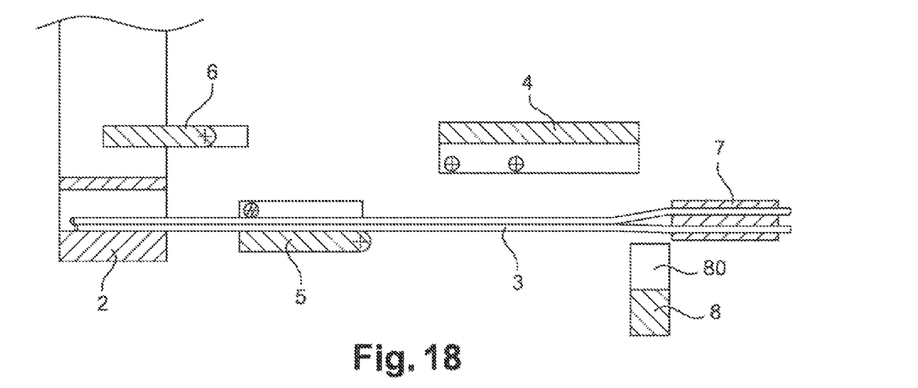
FIGS. 18, 19, 20 and 21 are side views of the device in the four successive positions during the inversion of the winding.

FIG. 18 shows the device at the end of the winding in the first direction; a bush 7 to guide the wires 3 is placed at the end of the device, and in front of this bush 7 there is placed a comb 8 with n notches 80, which is withdrawn from the wires 3. The carriage 4 is withdrawn from the wires 3 and the shafts 41 and 42 are withdrawn from the carriage 4.

Figure 19:
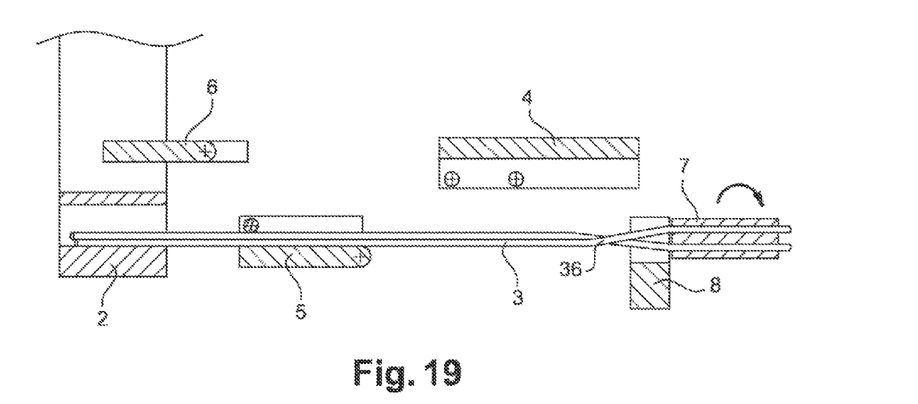

In order to perform the inversion of the wires 3 in the device, the bush 7 carries out rotation of 180°, and the comb 8 is placed in contact with the bush 7, with the wires 3 placed in the notches 80 in the comb 8, as can be seen in FIG. 19. The area of inversion of the wires 3 is indicated by the reference 36 in FIG. 19.

Figure 20:
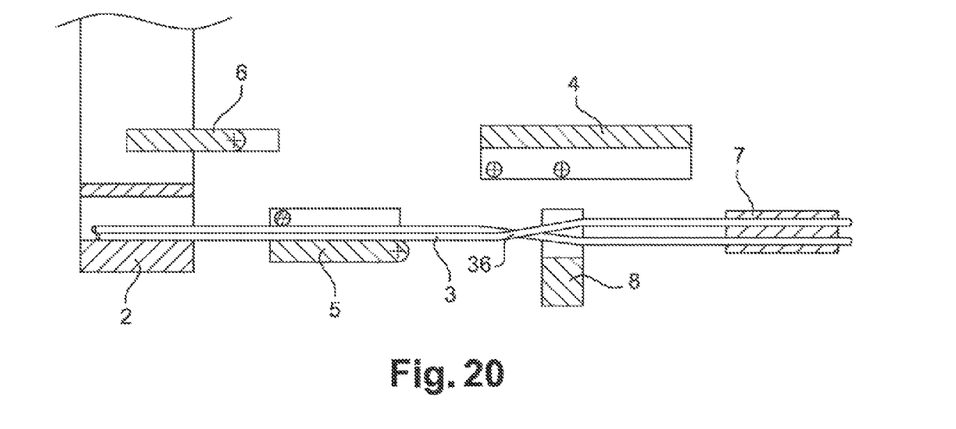
Figure 21:
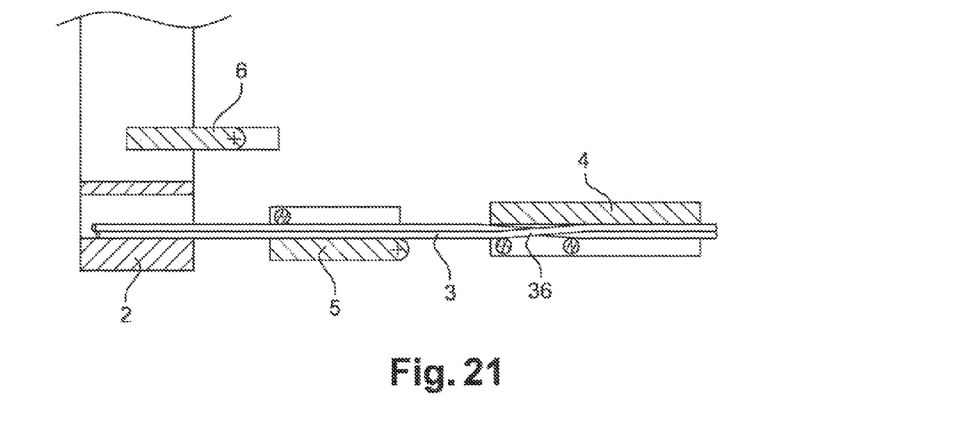

The comb 8 is then thrust back towards the carriage 5, so as to place the wires 3 in the new direction until the area of inversion 36 of the wires 3 is placed at a point situated between the two shafts 41 and 42 of the carriage 4, which can be seen in FIG. 20. The carriage 4 is then placed once more on the wires 3, with the area of inversion 36 placed between the two shafts 41 and 42, which have then been placed once more on the carriage 4, as shown in FIG. 21.

The winding recommences in the inverse direction, following the same principle as previously described for the first direction of winding.

By reiterating this winding several times the complete winding of the stator illustrated in FIG. 1 is carried out, with chignons which have a substantially triangular form.

The invention claimed is:

1. A method for winding a rotor or a stator (1) of a rotary electrical machine, the rotor or the stator comprising a series of teeth (21) which are delimited by notches (22), the method comprising:

inserting M continuous electric wires (3) constituting a turn, M being equal to at least one, into the notches (22) on the rotor or stator, wherein n×M wires (3) are wound simultaneously in a number n of the notches (22), n corresponding to the number of phases and being ≥2, the assembly of the M wires (3) constituting a phase and being inserted in a single notch (22).

2. The method according to claim 1, wherein each phase is produced with the continuous wire (3).

3. The method according to claim 1, wherein the M wires (3) are put parallel into the notches (22) and superimposed in a front loop (30*a*) or a rear loop (30*b*) which connects two successive notches (22).

4. The method according to claim 3, wherein the n×M wires (3) are wound by forming a first coil with the front loop (30*a*) which is situated at a front of the rotor or stator (1), and by inserting the n×M wires in the $n_1$ following notches (22), then a second coil with the rear loop (30*b*) which is situated at a rear of the rotor or stator (2), and by inserting the n×M wires (3) in the $n_2$ following notches (22).

5. The method according to claim 4, wherein the n×M wires (3) are wound by inverting the direction of the winding when all the notches (22) in the rotor or stator comprise at least one wire (3) of the n phases.

6. The method according to claim 3, wherein the front loop (30*a*) situated at a front of the rotor or stator or the rear loop (30*b*) situated at a rear of the rotor or stator has a substantially triangular form.

7. The method according to claim 3, wherein the M wires (3) which constitute the front or rear loop (30*a*, 30*b*) form an angle $\beta$ greater than $\alpha$ with a front or rear of the rotor or stator (1), and tan $\alpha$ is equal to f/d, f being a diameter of the wire (3) and d being a width of the tooth (21).

8. The method according to claim 7, wherein the M wires (3) which constitute the front or rear loop (30*a*, 30*b*) form the angle $\beta$ with the front or rear of the rotor or stator (1), and tan $\beta$ is equal to f+2 mm/d, f being the diameter of the wire (3) in mm and d being the width of the tooth (21) in mm.

9. The method according to claim 6, wherein the front or rear loop (30*a*, 30*b*) forms an isosceles triangle.

10. The method according to claim 9, wherein the front or rear loop (30*a*, 30*b*) forms a triangle with an angle of 90°.

11. The method according to claim 1, wherein M is greater than 1, and the M wires (3) are aligned in a base of the notch (22).

12. The method according to claim 1, wherein the notch (22) does not have a tooth root, or the tooth root is asymmetrical, and wherein M is greater than 1, and the M wires (3) are aligned adjacent to one another in a width of the notch (22).

13. The method according to claim 1, wherein the wires (3) are round.

14. A device for winding of a rotor or stator of a rotary electrical machine, comprising:
first and second carriages (4, 5) with a series of teeth delimited by n notches (40, 50), in each of which there are inserted M continuous electric wires (3) constituting a turn, with n corresponding to the number of phases of the rotary electrical machine, and being ≥2, and M being equal to at least one,
wherein M×n wires (3) are inserted simultaneously in the n notches (22) of the rotor or stator and in the n notches (40, 50) in the carriages (4, 5),
wherein all of the M×n wires (3) are bent together at least twice by bending the carriages (4, 5) relative to one another, and
wherein all of the M×n wires (3) thus bent are folded back in the following $n_1$ notches (22) of the rotary electrical machine rotor or stator.

15. The device according to claim 14, wherein the direction of winding is inverted by inverting the direction of folding back of the wires (3) in the notches (22), and wherein a guide bush (7) for the M wires (3) disposed at a rear of the carriages (4, 5) carries out rotation of 180°, and a comb (7) thrusts the turned back M wires (3) to an end of the first carriage (4).

\* \* \* \* \*